(No Model.)
G. W. COOK.
UNDERGROUND CONDUIT FOR ELECTRICAL CONDUCTORS.
No. 406,818. Patented July 9, 1889.
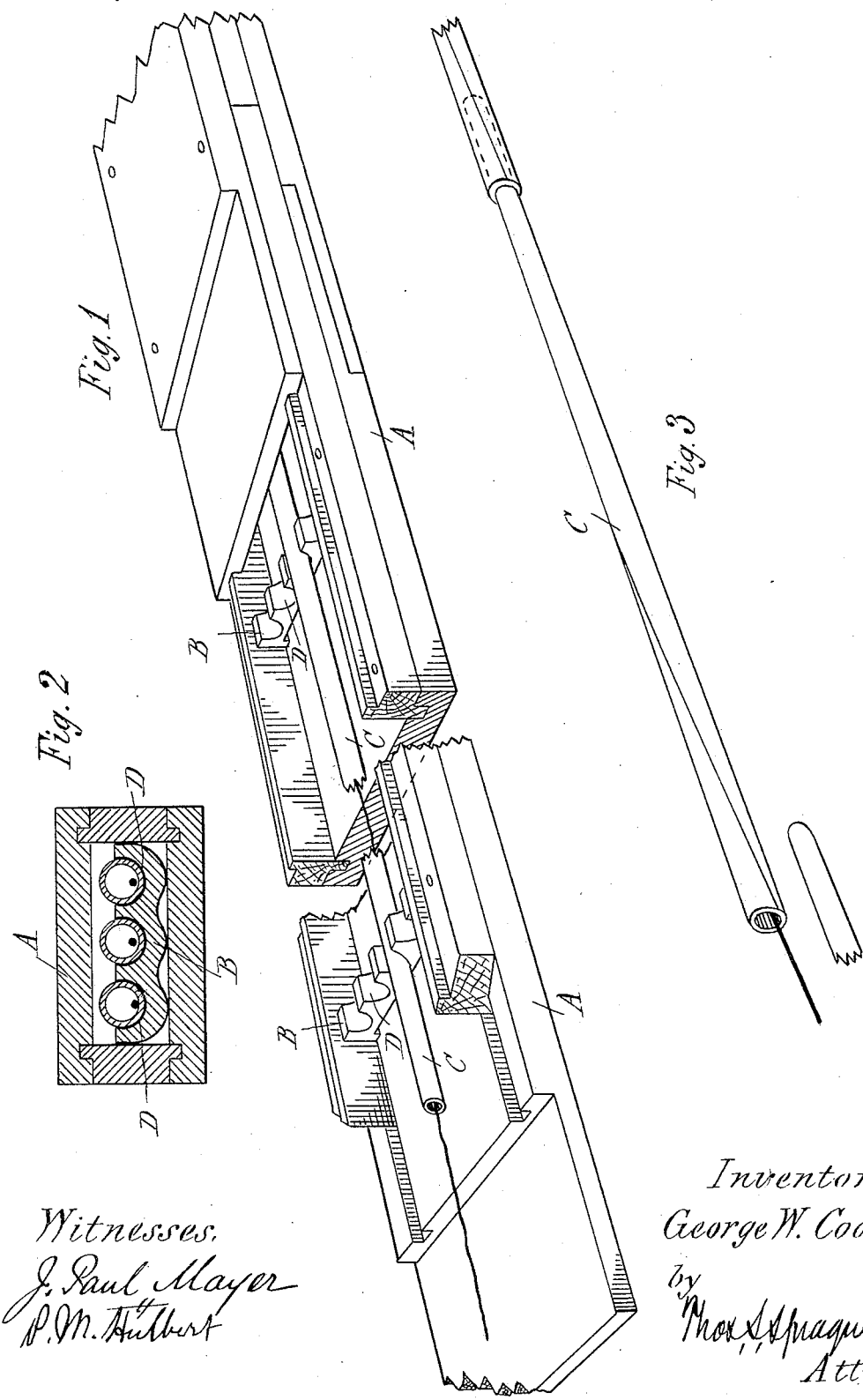
Witnesses.
J. Paul Mayer
P. M. Hulbert
Inventor
George W. Cook,
by
Thos. A. Sprague & Son
Att'y.

UNITED STATES PATENT OFFICE.

GEORGE W. COOK, OF DETROIT, MICHIGAN, ASSIGNOR OF ONE-THIRD TO CHARLES C. CANNY, OF SAME PLACE.

UNDERGROUND CONDUIT FOR ELECTRICAL CONDUCTORS.

SPECIFICATION forming part of Letters Patent No. 406,818, dated July 9, 1889.

Application filed December 8, 1888. Serial No. 292,978. (No model.)

*To all whom it may concern:*

Be it known that I, GEORGE W. COOK, a citizen of the United States, residing at Detroit, in the county of Wayne and State of Michigan, have invented certain new and useful Improvements in Underground Conduits for Electrical Conductors, of which the following is a specification, reference being had therein to the accompanying drawings.

This invention relates to new and useful improvements in underground conduits for electric wires; and the invention consists in the peculiar construction and arrangement of the conduit designed to be placed within an outer conduit or box—such as, for example, is shown in my concurrent application, Serial No. 284,599—the especial feature of my construction being the novel manner of insulating the wires, which may be naked or covered wires of any construction, and also whereby my conduit is constructed in sections of moderate lengths, thus greatly facilitating the laying of the conduit, all as more fully hereinafter described, and shown in the accompanying drawings, in which—

Figure 1 is a perspective view showing a box or covering in which my improved conduit is placed. Fig. 2 is a cross-section thereof. Fig. 3 is an enlarged perspective view showing the manner of connecting the paper tubes together.

A represents any suitable box or covering, in which are preferably placed the insulators B, preferably constructed as shown, and of any suitable material, such as glass.

C shows one section of my improved inner conduit, which I construct as follows: By taking sheets of paper covered with suitable cement and rolling them into a tube of suitable length—say two feet—slightly tapering from one end to the other, so that the tubes may be joined onto each other by inserting the smaller end of one tube into the larger end of the other tube, the cement, when dried, holds this section or tube firmly in the shape into which it is formed. These tubes I make of a suitable diameter to be readily strung on the wire or cable which they are intended to inclose. In constructing these tubes I preferably use what is commercially known as "asbestus paper," being a paper or sheet formed exclusively of asbestus, with enough adhesive material to hold the particles together. The advantages of this kind of paper are its long life, the impossibility of combustion at any ordinary heat, together with the water-proof qualities of the paper. If made of straw-board or other grades of common commercial paper, I preferably treat the tube to a bath of melted paraffine, so as to coat it thoroughly inside and out, and completely impregnating it therewith, and to this end I preferably use as porous paper as can be had, which needs to be, however, of sufficient stiffness to permit of its being firmly stuck together in the manner described.

In proceeding to lay a conduit of my construction, I first lay in the trench the box, of any suitable construction, minus the top board. Then I place, at suitable distances apart, the insulating-bridges B, shaped in such fashion as to form suitable bearings D for holding the paper tubes about equidistant between the top and bottom and regular distances apart if there is more than one wire or cable to be placed into the conduit. The paper tubes are then slipped over the end of the wire or cable which it is desired to lay, with the smaller end of one tube engaging into the large end of the other, allowing the tubes to telescope each other for a little distance, so that the small ends will be firmly wedged into the large ends. This is continued until the wire is covered its entire length, and at proper intervals, the top board being secured in position, the trench may then be filled and the conduit is completed.

By constructing the paper tubes as described I have found that by merely sticking the tubes into each other they form air-joints, and in the use of ordinary paper tubes soaked in paraffine the paraffine acts not only as an insulator, but also to waterproof the tubes, thereby excluding all moisture from the interior. If desired, this box in which the tubes are placed may be entirely filled with some water-proof compound. Thus it is obvious that even a naked wire strung in a conduit of my construction is absolutely and permanently insulated and the induction reduced to a minimum. It will be understood that the paper tubes, aside from their insulating qualities, insure the parallelism of the wires, thus keeping them out of contact or approach with each other, also preventing all possible displacement of the wires within the box. It also allows of readily drawing the wires through the tubes without danger of injury thereto.

The use of asbestus paper for constructing these tubes obviates the necessity of covering them with paraffine. The asbestus paper may also be dipped into the paraffine with similarly good results. It is evident that included within the spirit of my invention would be paper tubes parallel their entire length and having one end chamfered off to a suitable diameter to engage into the other end, although I preferably employ tubes which taper their entire length.

I deem it important that the tubes be of like taper externally, whereby they may be readily fitted together to form a tight joint much more readily than where they are formed with shouldered ends; besides, the present construction involves less work in the manufacture of the tubes.

What I claim as my invention is—

1. In a conduit for electrical conductors, in combination with an outer conduit, an inner conduit consisting of a series of like paper tubes fitted one within the other, substantially as described.

2. A conduit for electrical conductors, consisting of a series of like paper tubes saturated with paraffine and taper-jointed together.

3. A conduit for electrical conductors, consisting of a series of like tapering asbestus-paper tubes, substantially as described.

In testimony whereof I affix my signature, in presence of two witnesses, this 15th day of November, 1888.

GEORGE W. COOK.

Witnesses:
J. PAUL MAYER,
P. M. HULBERT.